UNITED STATES PATENT OFFICE.

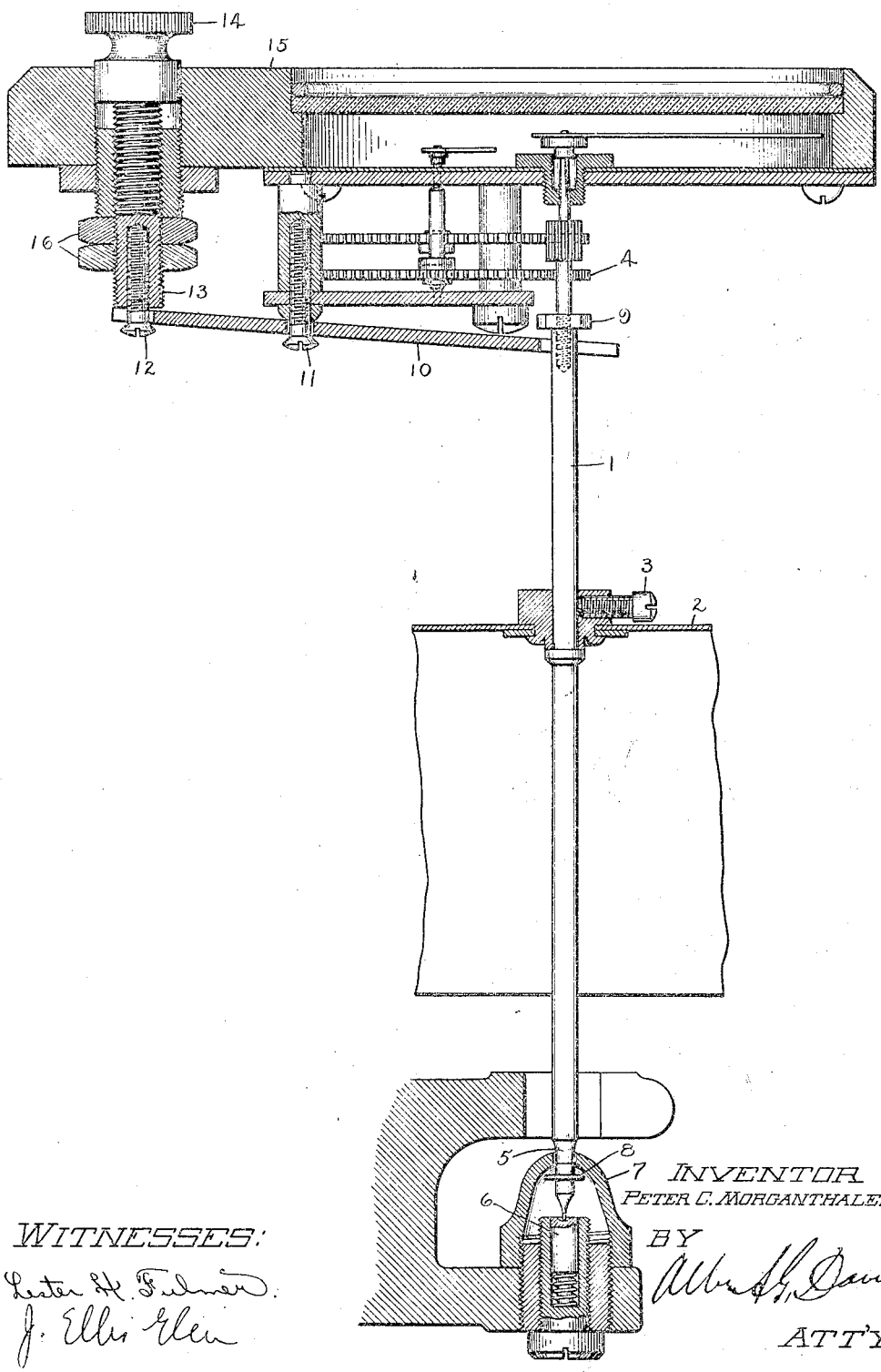

PETER C. MORGANTHALER, OF FORT WAYNE, INDIANA, ASSIGNOR TO GENERAL ELECTRIC COMPANY, A CORPORATION OF NEW YORK.

ELECTRIC METER.

No. 925,125.  Specification of Letters Patent.  Patented June 15, 1909.

Application filed January 17, 1908. Serial No. 411,255.

*To all whom it may concern:*

Be it known that I, PETER C. MORGAN-THALER, a citizen of the United States, residing at Fort Wayne, county of Allen, State of Indiana, have invented certain new and useful Improvements in Electric Meters, of which the following is a specification.

My invention relates to electric meters, and more especially to that portion of a meter mechanism which is commonly known as the shipping device.

Many of the electric meters, which are in use at the present time have a shaft resting upon a thrust-bearing whose bearing surface is formed of a jewel in order to minimize friction. When such meters are transported or shipped, it has been found that the jar incident to such transportation is apt to crack or damage the jewel bearing surface, unless means are taken to hold the meter shaft firmly and remove the jewel bearing from contact with the bearing pivot of the meter shaft.

I am aware that there are many forms of shipping devices for electric meters but the greater portion of these devices is inconvenient when applied to a meter which it is desired to frequently transport and is frequently used, such as a meter in use for calibrating purposes, and the object of my invention is therefore, to provide a shipping device which can be readily and conveniently used on such meters, and will be cheap and reliable.

For a further understanding of my invention, reference may be had to the accompanying drawing, which shows a vertical view, partially in section, of a meter shaft to which my new invention is applied, and a portion of the meter mechanism.

I have shown a shaft 1, which may be constructed in any well known fashion, and to which is attached the armature 2, held by set-screws 3. I have shown a cup-shaped armature, but it is obvious that any form of armature may be used in the application of my invention. The armature through the shaft drives the gear-train 4, in any well-known fashion. Attached to the lower end of the shaft I have shown the bearing pivot 5, which rests upon the thrust-bearing 6, which may be made in any well known fashion.

7 is a lock-nut, which locks the bearing in the well known manner, but I construct this nut in a peculiar manner, fashioning the upper portion of it in the form of a cap, which has a hole through its center, through which passes the meter shaft. I have shown a collar 8 attached to the bearing pivot and revolving inside cap 7, and so arranged with reference to cap 7, that when the meter shaft is raised, this collar will come in contact with cap 7, and thus hold the lower portion of the meter shaft firmly. At the upper end of the shaft I have shown a collar 9, and in operative relation with this collar a lever 10, one end of which encircles the shaft, and is so arranged that normally its position is below collar 9, and the shaft can freely revolve. Lever 10 is loosely pivoted intermediate its ends upon screw 11, which is fixed to some portion of the meter-frame or casing, and at the end opposite that encircling the shaft is loosely attached to a screw 12 fastened to the operating screw 13. Screw 13 has a knurled head 14, which extends above the upper part of the meter casing 15, and has lock-nuts 16, which prevent an upward movement of more than a desired amount.

The operation of my device will then be as follows: When it is desired to ship the meter, screw 14 is turned in the usual manner, which causes lever 10 to engage with collar 9, thus raising the shaft off of the lower jewel bearing and holding the upper portion firmly by frictional contact between collar 9, and lever 10 and the lower portion firmly by frictional contact between collar 8 and cap 7.

While I have shown my invention as carried out with a certain construction and certain parts, it will be obvious that changes may be made in this construction and these parts, which do not depart from the spirit of my invention and are within the scope of the appended claims.

What I claim as new and desire to secure by Letters Patent of the United States, is,—

1. In a meter, the combination of a shaft with a lower thrust bearing, a collar at each end of the shaft, a lever in operative relation with one collar for lifting the shaft away from the bearing and holding one end firmly, and a cap for the bearing encircling the shaft and in operative relation with the other collar holding the same firmly when the shaft is lifted.

2. In a meter, the combination of a shaft, a collar at each end thereof, a lever operated by the action of a screw mechanism at one end, the other end in operative relation to the upper collar of the shaft, so that upon movement of the screw it raises the shaft and holds the same firmly, and a fixed cap surrounding the lower end of the shaft and in operative relation to the lower collar of the shaft holding the same firmly when the shaft is raised.

3. In a meter, the combination of a vertical shaft with a lower thrust bearing, and a collar at each end, a lever in operative relation with the upper collar raising the shaft off the thrust-bearing holding the upper collar firmly and controlled by a screw extending beyond the upper portion of the meter casing, and a cap attached to the lower bearing surrounding the shaft above the lower collar and holding the same firmly when the shaft is raised.

In witness whereof I have hereunto set my hand this 15th day of January, 1908.

PETER C. MORGANTHALER.

Witnesses:
C. S. TURNBLÆSON,
C. E. HORN.